Patented Aug. 18, 1931

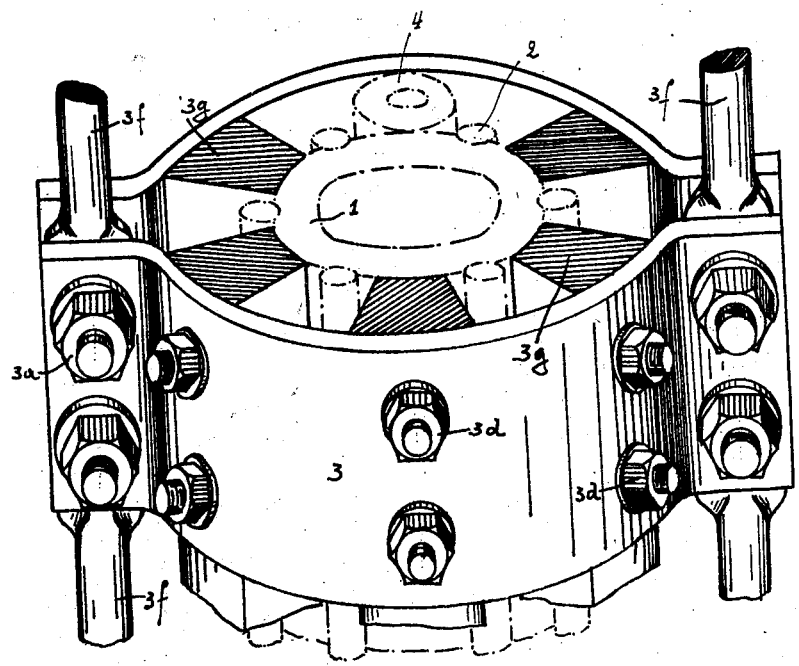

1,819,983

UNITED STATES PATENT OFFICE

EDMOND VOITURON, OF BRUSSELS, BELGIUM

DISMOUNTING DEVICE FOR LEAD COLUMNS, PIPES, OR THE LIKE

Original application filed May 17, 1928, Serial No. 278,511, and in Belgium May 20, 1927. Divided and this application filed February 8, 1930. Serial No. 426,963.

It is known to use, in connection with the manipulation and the working of acids and solutions or products corroding ordinary metals, columns or piping and the like made of soft or hard lead and externally reinforced by example with removable leaded rods of iron or other metal disposed along the generating lines of the said columns or the like.

In this case, the rods are secured to the piping and two or more adjacent pipes are realized with aid of devices affording free play for the expansion of rods and piping.

The object of the invention is a device by which columns or piping are easily dismounted.

According to this view the invention provides for a device which will constitute an easily dismountable assemblage and will be provided with a stirrup-shaped device permitting the easy raising for example by means of a sliding-platform.

The device according to the invention is applicable to the columns or piping reinforced or not.

The columns are accordingly stayed by means of bronze clamps supported upon said columns by wooden-pieces extending along the columns; these clamps and the wooden-pieces are joined together by means of bronze bolts protected by lead caps.

The drawing shows by way of example and in a nonlimiting manner an embodiment of the invention. This latter extends to the various original features the arrangement illustrated comprises.

The figure shows a perspective of a corset according to the invention.

The columns 1 and 2 are assembled by means of bronze clamps 3 in two parts supported upon the piping by wooden-pieces 3g.

The various pieces of the embodiment are joined together by means of bronze bolts as 3a and 3d protected by lead caps.

Rods as 3f serve for supporting the device. To this view the upper rods 3f may be joined for forming a stirrup which may be fixed to a crane-engine, by example to a sliding-platform. Otherwise the lower rods serve as a connecting means between the assembling device shown and an analogous device fixed upon the same portion of the piping or upon a different portion situated in the prolongation of the first one.

As apparent on the drawing, the wooden-pieces 3g project on each side of the bronze clamps 3 and may extend alongside of the portion of piping which is considered and in that case the said wooden-pieces are pressed against the columns of the said portion by means of clamps analogous to the clamps 3 in order to form a corset supporting the whole of the portion.

Besides, the corset so constituted may bear a stirrup permitting the easy raising for example by means of a sliding-platform.

What I claim is:

1. A device for demounting columns of lead or the like, comprising wood members applied on said columns, metallic stays of several parts applied against the above members and assuming their form and bolts firmly retaining the stays and the wood members.

2. Device for demounting lead or the like columns, comprising wood members applied on said columns, multiple part metallic stays applied against said members and assuming their form, rods connecting the said stays and intended to be engaged by a lifting apparatus and bolts firmly connecting the said stays and wood members.

In testimony whereof I have affixed my signature.

EDMOND VOITURON.